UNITED STATES PATENT OFFICE.

ATTILIO CELLINO, OF BUENOS AIRES, ARGENTINA, ASSIGNOR TO CENTRAL BATTERY CORPORATION, A CORPORATION OF NEW YORK.

BATTERY ELEMENT AND PROCESS OF FORMING THE SAME.

No Drawing. Application filed June 15, 1916, Serial No. 103,857. Renewed October 26, 1920. Serial No. 419,735.

*To all whom it may concern:*

Be it known that I, ATTILIO CELLINO, a subject of the King of Italy, residing at Buenos Aires, in the Argentine Republic, have invented a new and Improved Battery Element and Process of Forming the Same, of which the following is a specification.

This invention relates to electric batteries of either the primary or secondary (reversible primary) type, the object of the invention being the provision of a battery element of which zinc or an equivalent metal (cadmium or the like) is an essential component, the said battery element substantially resistant to chemical action in that it is capable of withstanding for long periods or indefinitely, on open circuit, the solvent action of acid electrolytes; but retaining nevertheless the capability of performing with a high degree of electrical efficiency the functions of an oxidizable (negative) electrode when the battery circuit is closed, being therefore susceptible to electrochemical action.

I have discovered that if zinc, in sheet or other appropriate form, preferably after amalgamation in accordance with known methods, be treated superficially with suitable materials of an oily or greasy (oleaginous) character, the resulting element exhibits the following novel characteristics:

(1) It is capable of withstanding for long periods, or indefinitely, the solvent action of sulfuric acid solutions and like acid electrolytes as commonly used in the battery art, so long as the battery stands on open circuit so that no current flows through the system;

(2) Upon closing the electric circuit the zinc passes into solution with generation of current at high electrical efficiency. On closed circuit the coating tends to prevent wasteful (chemical) solution of zinc, with the result that the current generated corresponds much more closely to theory than is the case with non-treated electrodes.

(3) The oleaginous coating upon the oxidizable electrode acts to limit the rate of discharge of the battery in which the electrode is employed, thereby avoiding injury by short circuiting. The limit of the rate of discharge appears to be dependent, for a given oleaginous material, upon the thickness of the coating.

One method of preparing a battery element in accordance with the present invention is as follows, it being understood that the invention is not limited to the specific manipulative methods described by way of illustration, nor to the employment, as coating materials, of the specific oleaginous substances which are at present regarded as preferable.

Zinc or equivalent metal in sheet or other suitable form is first amalgamated with mercury, employing any approved method, such for example as treatment with metallic mercury, or with the sulfate or other mercury salt. The plate is then heated until "dried," that is until the free mercury has disappeared from the surface.

The amalgamated zinc is next thoroughly coated with an oleaginous substance which may either be of organic or inorganic origin. The oleaginous material chosen should be one which will adhere to the amalgamated plate and form a protective coating thereon, which will not melt at the operating temperature of the battery or under normal conditions of use, and which is insoluble in water and acid solutions. Ordinary lard may be employed, but I prefer the grease known as "motor grease", which is obtained as a residuum in the distillation of petroleum and similar products.

A suitable soluble salt, such for example as the ferrocyanide of potassium or sodium, may with advantage be incorporated with the grease in such manner as to form a paste which may be applied to the plate. Or a similar effect may be secured by dissolving the salt in the electrolyte in which the grease-covered plate is mounted as the negative electrode, and then charging the battery. The effect of the salt is to facilitate the charging operation when the coated plate is employed as the negative electrode of a secondary or reversible primary battery. Its employment is not essential, however, as the battery can readily be charged and recharged without the use of such additions. When the soluble salt is incorporated with the grease the proportion employed may vary from 5 to 10 per cent of the mass, or somewhat more, care being exercised to avoid so great a proportion as materially to lessen the adhesion of the grease to the plate. In general, the larger the proportion used, within suitable limits, the more readily the charging operation may be performed. In the case of primary batteries, where the operation of charging is not practiced, the salt may of course be omitted.

The negative zinc element thus prepared is then assembled with others, and with suitable positive elements, to constitute the battery. The present invention is not restricted to the employment with the herein-described negative electrodes of any particular type of positive electrodes, although I prefer to use positive electrodes of the nature described in my copending application Serial Number 103,858, filed of even date herewith. As described in the said application these positive electrodes are compounded from a mixture of an oxid of lead, peroxid of manganese, and ammonium sulfate, said mixture being dehydrated by treatment with concentrated sulfuric acid, and mounted, together with the treated negatives, in a sulfuric acid electrolyte.

According to the above described embodiment of the invention, the protective grease is applied to a continuous sheet or plate of zinc. As a modification of the invention I may prepare the zinc in the form of particles individually encased in or surrounded by an extremely thin skin or film of the oleaginous material, and then consolidate these by pressure into a coherent and compact body. One method of preparing electrodes of this type is the following:

After the zinc plates have been prepared for use as negative electrodes in the manner first above described, they are assembled, together with suitable positive electrodes, in such manner as to constitute a secondary battery. The battery may then be charged in the usual way, and then discharged at a normal rate. Thereafter the battery is charged at a much higher rate, say about 10 amperes for each kilo of electrode weight in the battery. As a result of this procedure, the coating of the prepared negatives undergoes a change, becoming flocculent in character; and a portion of it is thrown off and floats on the surface of the electrolyte. The flocculent material is then collected, the floating portion being recovered and that still adhering to the plates being removed by scraping; and the whole is then subjected to pressure in molds of suitable size and shape, and thereby consolidated into a compact self-supporting mass or body which is directly available for use as a negative electrode.

Other metals such for example as cadmium, which, because of their capability of evolving hydrogen when entering into combination with acids give a high battery voltage, may be employed in place of zinc in the practice of this invention. I prefer zinc, however, since because of price conditions, it is at the present time the metal which is commercially most available for the purpose.

By means of my invention I obtain the advantages incident to the use of zinc as an electrode material in an acid electrolyte, while avoiding danger of destruction of the electrode either by local electrolytic action on open or closed circuit, or through short circuiting. Negative electrodes prepared as above described are suitable for use in primary batteries in connection with suitable positive electrodes, preferably such as have an affinity for hydrogen and therefore possess a depolarizing action, such for example as peroxid of lead.

Repeated tests of negative elements prepared as hereinabove described have fully demonstrated that although capable of functioning with high electrical efficiency as soluble electrodes in the normal operation of a battery on closed circuit, they are nevertheless substantially or practically immune to the solvent action of the acid electrolyte upon open circuit. The reason for this observed effect is not now known, although explanatory theories have been advanced. The term "immunized zinc" is herein applied to the treated metal possessing the described characteristics.

One possible explanation which is offered without thereby limiting the invention is that under the action of the electric current when the circuit is closed the oleaginous coating tends to form with the electrolyte an unstable but electrically conductive emulsion, which permits more or less free solution of the zinc, and allows the plate to function normally as a battery negative. Upon opening the circuit this unstable emulsion may break down, leaving upon the negative electrode a substantially continuous protective coating, which suffices to protect the metal from the acid electrolyte. Such explanation is, however, to be regarded as tentative only.

The word "zinc" is used in the claims to include metals which are equivalent to zinc for the purposes of this invention.

I claim:—

1. A battery element comprising zinc to which has been applied an oleaginous coating capable of substantially protecting the metal from an acid electrolyte upon open circuit, but permitting solution of the metal, with generation of current, upon closing the circuit.

2. In a battery, the combination with an acid electrolyte, of a zinc electrode presenting a surface which is substantially resistant to chemical action, but susceptible to electrochemical action.

3. A battery element comprising a zinc base combined with a coating of a grease insoluble in the electrolyte.

4. A battery element comprising immunized zinc.

5. A battery element comprising particles of zinc consolidated into a coherent body, said particles presenting surfaces which are substantially resistant to chemical action, but susceptible to electrochemical action.

6. A battery element comprising particles of zinc coated with an oleaginous substance and compressed into a coherent body.

7. A battery element comprising aggregated particles of immunized zinc.

8. Process of preparing zinc for use in batteries, consisting in applying thereto a coating containing an oleaginous substance.

9. Process of preparing zinc for use in batteries, consisting in amalgamating the zinc and then applying thereto a coating containing an oleaginous substance.

10. Process of preparing zinc for use in batteries, consisting in applying thereto a coating capable of protecting the metal from an acid electrolyte upon open circuit, but permitting solution of the metal, with generation of current, upon closing the circuit.

In testimony whereof I have affixed my signature, this 14th day of June, 1916.

ATTILIO CELLINO.